(12) United States Patent
Barna

(10) Patent No.: US 7,832,782 B2
(45) Date of Patent: Nov. 16, 2010

(54) STAKE SYSTEM FOR FLATBED VEHICLES

(75) Inventor: Anthony F. Barna, North Massapequa, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 0 days.

(21) Appl. No.: 12/580,801

(22) Filed: Oct. 16, 2009

(65) Prior Publication Data

US 2010/0072770 A1 Mar. 25, 2010

Related U.S. Application Data

(62) Division of application No. 12/233,892, filed on Sep. 19, 2008, now Pat. No. 7,731,259.

(51) Int. Cl.
*B60P 7/06* (2006.01)
(52) U.S. Cl. .......................................... 296/43; 296/36
(58) Field of Classification Search ................... 296/43, 296/36
See application file for complete search history.

(56) References Cited

U.S. PATENT DOCUMENTS

| | | | | |
|---|---|---|---|---|
| 1,333,396 A | * | 3/1920 | Erret | 296/43 |
| 1,333,990 A | * | 3/1920 | Mills | 296/43 |
| 3,661,420 A | * | 5/1972 | Swanson et al. | 296/43 |
| 3,674,304 A | * | 7/1972 | Swanson | 296/43 |
| 3,764,177 A | * | 10/1973 | Woodward | 296/43 |
| 3,794,375 A | * | 2/1974 | Woodward | 296/36 |
| 3,841,695 A | * | 10/1974 | Woodward | 296/43 |
| 4,236,748 A | | 12/1980 | Cloutier et al. | |
| 4,427,230 A | | 1/1984 | Avny | |
| 5,338,084 A | * | 8/1994 | Wardell | 296/105 |
| 5,546,972 A | * | 8/1996 | Wardell et al. | 135/129 |
| 5,915,900 A | * | 6/1999 | Boltz | 410/110 |
| 6,256,942 B1 | * | 7/2001 | Schatz | 52/155 |
| 6,536,824 B2 | | 3/2003 | Anderson | |
| 2008/0063497 A1 | * | 3/2008 | Spitsbergen | 414/539 |

* cited by examiner

*Primary Examiner*—Kiran B. Patel
(74) *Attorney, Agent, or Firm*—Cantor Colburn LLP

(57) ABSTRACT

A stake system for providing a removable support for articles being transported on flatbed vehicles is provided. The stake system has a composite body with a cap on one end and a boot on the opposite end. A cover layer is shrink wrapped over the composite body and may include a heat-activated adhesive. The boot includes a flange that contacts the flatbed vehicle when the stake system is inserted into pockets formed in the flatbed vehicle. A pin is tethered to the boot and may be inserted into a hole in the boot adjacent to the underside of the flatbed vehicle. The pin provides a convenient means for locking the stake system to the vehicle and prevents the stake system from disengaging during operation.

6 Claims, 5 Drawing Sheets

STAKE SYSTEM FOR FLATBED VEHICLES

CROSS-REFERENCE TO RELATED APPLICATIONS

This is a divisional application of U.S. patent application Ser. No. 12/233,892, entitled "STAKE SYSTEM FOR FLATBED VEHICLES" filed Sep. 19, 2008, which is hereby incorporated by reference in its entirety.

BACKGROUND OF THE INVENTION

The present invention relates generally to a stake for securing loads on a flatbed vehicle and more particularly to a stake having a composite body.

Vehicles having open, unenclosed areas to accommodate loads of varying types and configurations are quite common Examples of such vehicles are flatbed trucks and flatbed railroad cars. Frequently, such vehicles have a generally rectangular bed that includes a number of stake-receiving pockets positioned about the perimeter and center portions thereof. The stakes are elongated members positioned within the peripherally disposed stake pockets and are provided to restrain the load in the event it shifts, and to prevent it from falling off the bed.

Stakes are typically fabricated out of wood such as oak or hickory, or a metal such as steel or aluminum. A u-shaped metal band may also be wrapped around one end of the stake where the stake is inserted into the vehicle pockets. The metal bands along with the wooden stake typically provide sufficient weight to keep the stake in the vehicle pocket during use. However, under rough road conditions, the stakes occasionally exit the pocket resulting in a loss of the stake.

The stakes often become damaged during use due to shifting loads and impacts from other equipment, such as forklifts for example. The wooden stakes are also subject to damage due to wet conditions and insects. As such, truck stakes often have a limited lifespan and must be replaced on a regular basis to prevent the loads from falling off the bed during operation.

Thus, while existing stakes are suitable for their intended purpose, there remains a need for improvements. In particular, there remains a need for improvements in the life and durability of truck stakes and the reliability in securing the stake to a vehicle body.

SUMMARY OF THE INVENTION

A vehicle stake system is provided having a composite body. A boot is coupled to the composite body in a first opening, wherein the opening is arranged in one end of the boot. A cap is coupled to the composite body opposite the boot. A cover layer is bonded to the composite body between the boot and the cap.

A stake system for a flatbed vehicle having pockets is also provided. The stake system includes a boot sized to fit in the pocket. The boot has a first opening at one end and a plurality of core openings on an opposite end. The boot further includes a second opening adjacent the plurality of core openings and is arranged substantially perpendicular to the first opening. A pultruded fiberglass body member having one end is positioned in the first opening. A cap having a third opening is sized to receive the body member opposite the boot. A cover layer is bonded to the body member between the boot and the cap.

A flatbed vehicle is also provided having a substantially planar area that includes a first side and a second side. The planar area further includes a plurality of pockets formed substantially perpendicular and through the planar area. A plurality of stakes is provided where each of the stakes is associated with one of the plurality of pockets. The stakes comprise a boot sized to fit in the associated pocket, the boot having a flange on one end wherein the flange is in contact with the planar area first side, the boot further includes a first opening adjacent the flange. A composite body coupled to the first opening. A cap is coupled to the composite body. A cover layer is bonded to the composite body between the boot and the cap.

BRIEF DESCRIPTION OF THE DRAWINGS

Referring now to the drawings, which are meant to be exemplary and not limiting, and wherein like elements are numbered alike.

DETAILED DESCRIPTION

Figure 1:
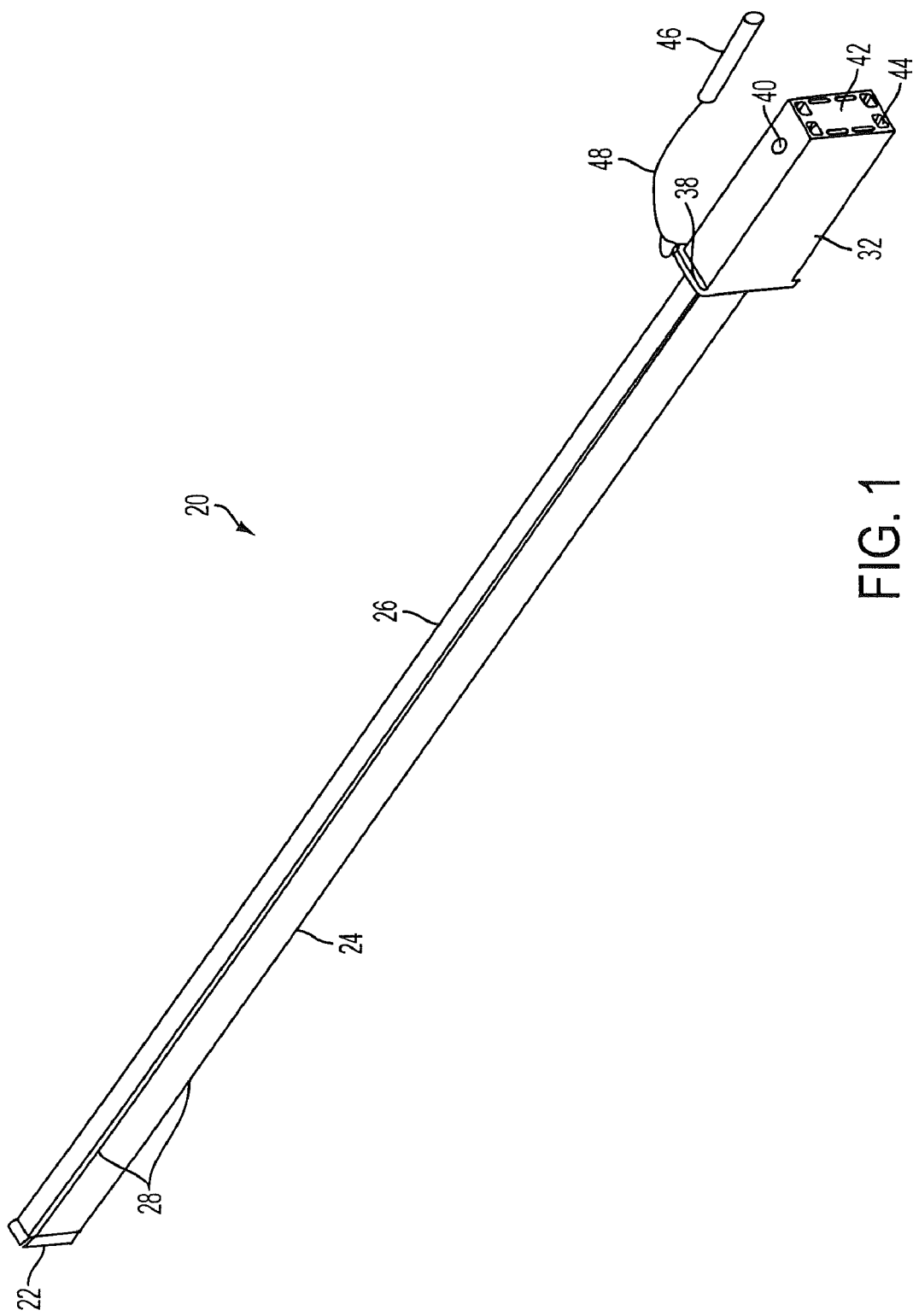
FIG. 1 is a perspective view illustration of a stake in accordance with an embodiment of the invention.

FIG. 1 illustrates an exemplary embodiment of a stake system 20 for use with a flatbed vehicle. The stake system 20 is used in conjunction with pockets in a flatbed vehicle to provide a removable support for articles contained on the vehicle. As used herein, a flatbed vehicle is any means of transportation having a planar area for moving and storing goods and items. As such, a flatbed vehicle may be a truck, pickup truck, a truck trailer, a railway car, a road train, hovercraft, or a boat for example. Further, the stake system 20 may also be used as a divider or to secure cargo within enclosed vehicles such as a cargo container, a panel truck, or an airplane for example.

The stake system 20 includes an end cap 22 fitted over the end of a composite body member 24. As will be discussed in more detail herein, the end cap 22 is made from a durable polymer, such as nylon 6/6 for example, that is capable of performing in harsh operating environments without chipping, cracking or exhibiting excessive wear.

Figure 2:
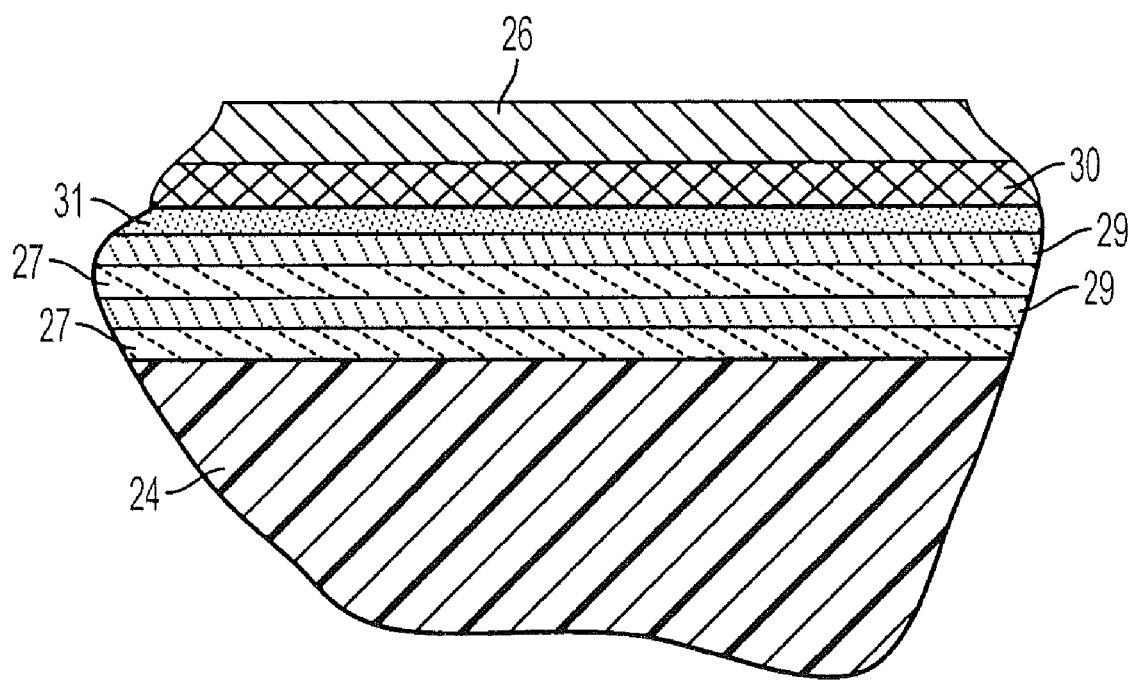
FIG. 2 is a partial side sectional view illustration of a stake body for the stake of FIG. 1; of FIG. 1.

The body member 24 has rounded corners 28 to facilitate the handling of the stake 20 during use. In the exemplary embodiment, the body member 24 is made from a fiberglass laminate pultrusion having alternating layers of roving layers 27 and mat layers 29 as shown in FIG. 2. The laminate layers 27, 29 are embedded in a resin such as epoxy, polyester or vinyl ester for example. An optional veil layer 31 may be laid over the outer surface of the body member 24 to protect the composite layers 27, 29 from damage. The veil layer 31 is an ultra thin mat similar to a mat layer 29 that allows for a resin rich surface. The veil layer 31 may be made from any suitable durable material, such as Kevlar.

The body member 24 is further covered by cover layer 26 that protects the composite body member during use. The cover layer 26 provides an additional layer of protection for the laminate layers 27, 29 and also protects the operator from coming into contact with fiberglass strands. In the exemplary embodiment, the cover layer 26 is a mono-directional shrink-wrap material, such as polyolefin or polyvinyl chloride (PVC) for example, having a thickness of 0.030 inches. In another embodiment, the cover layer 26 or the pultruded laminate layers 27, 29 are made from a self-healing polymer, such as self-healing polymers having micro or nano scale capsules and catalyst particles within the resin for example. The capsules rupture when contacted by a crack releasing a liquid monomer that fills the crack. The catalyst subsequently polymerizes the monomer and crack propagation is halted.

In one embodiment, shown in FIG. 2, a layer of adhesive 30 is disposed between the cover layer 26 and the body 24. The adhesive 30 provides advantages in the event the cover layer 26 is damaged during use, the adhesive prevents the cover layer 26 from peeling away from the damaged location and exposing more of the body 24. It should be appreciated that the adhesive 30 may be a coating that is integral with the cover layer 26 and heat activated during assembly, such as during the heat shrinking for example. Alternatively, the adhesive 30 may be applied to the body 24 before the cover layer 26 is applied.

Figure 3:
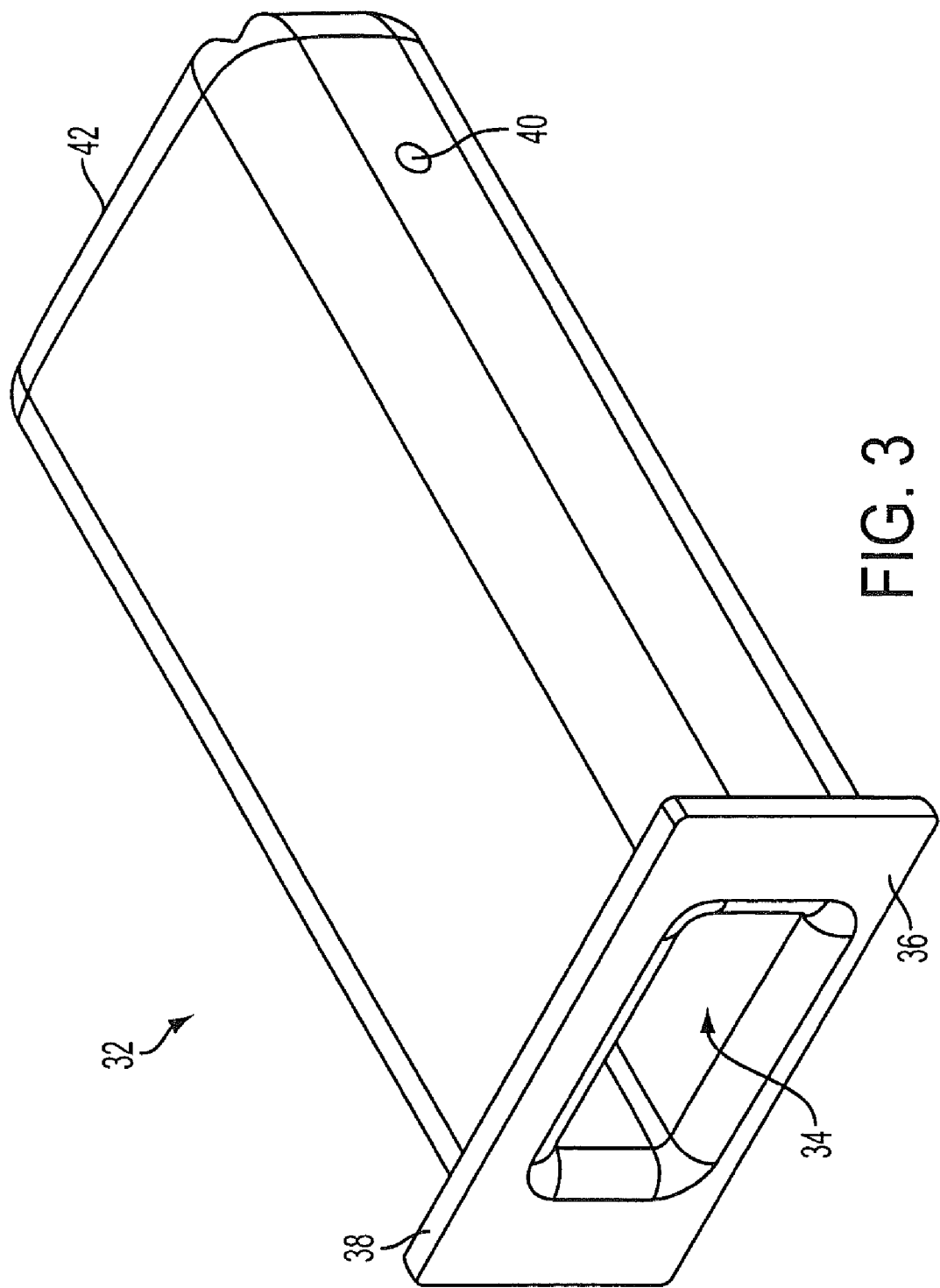
FIG. 3 is perspective view illustration of a stake boot for the stake

On the opposite end of the body member 24 is a boot 32. As shown in FIG. 1 and FIG. 3, the boot 32 includes an opening 34 for a cavity on an end 36. In the exemplary embodiment, the opening 34 extends ⅔ to ¾ of the length of boot 32 in a direction substantially perpendicular to the end 36. The opening 34 may have a draft such that the bottom is smaller than the entrance, however, the opening 34 is sized to receive the body member 24 to a sufficient depth to allow the body member 24 to be coupled to the boot 32. In one embodiment, the body member 24 is bonded to the boot 32 by an adhesive. In another embodiment, the body member 24 is coupled to the boot 32 by a press fit.

The boot 32 includes a flange 38 extending from the end 36. As will be discussed in more detail herein, when installed on a vehicle, the boot 32 is inserted into a pocket. The flange 38 rests against the vehicle when the boot 32 is fully inserted and prevents the stake 20 from falling through the pocket. The boot also includes an opening 40 adjacent the end 42 opposite the end 36. The opening 40 extends through the width of the boot 32 and is substantially perpendicular to the opening 34. A plurality of core openings 44 may be optionally formed in the bottom of the boot 32. The core openings 44 reduce the weight of the boot 32 while allowing for structural support of the opening 40.

The boot 32 is made from a durable polymer that is capable of providing wear resistance with structural strength. In the exemplary embodiment, the boot 32 is injection molded from nylon 6/6 (such as Zytel® manufactured by E. I. du Pont de Nemours and Company). Preferably, the boot 32 is injection molded with virgin material, meaning that no regrind material is used. During testing, it was found that the injection molding of virgin nylon 6/6 provided advantages in resistance to wear, such as that caused by dragging the stake 20 over an asphalt or concrete surface for example. The addition of regrind nylon materials substantially increased the amount of visible wear.

The stake 20 also includes a retaining pin 46 that has a diameter sized to allow the pin 46 to be inserted into the opening 40. During operation, the pin 46 is inserted into the opening 40 to prevent the stake 40 from moving laterally out of the vehicle pocket. The pin 46 is made from a suitable material, such as steel or aluminum for example, that is capable of withstanding the impact loads of the pin on the vehicle during use without shearing. In the exemplary embodiment, the pin 46 also includes features such as a locking pin (not shown) that prevents the pin 46 from falling out of the opening 40 during operation. Alternately, the pin 46 may have a hole on one side to receive a cotter pin. The pin 46 is coupled to the boot 32 by a cable 48 that attaches to a hole in the flange 38.

Figure 4:
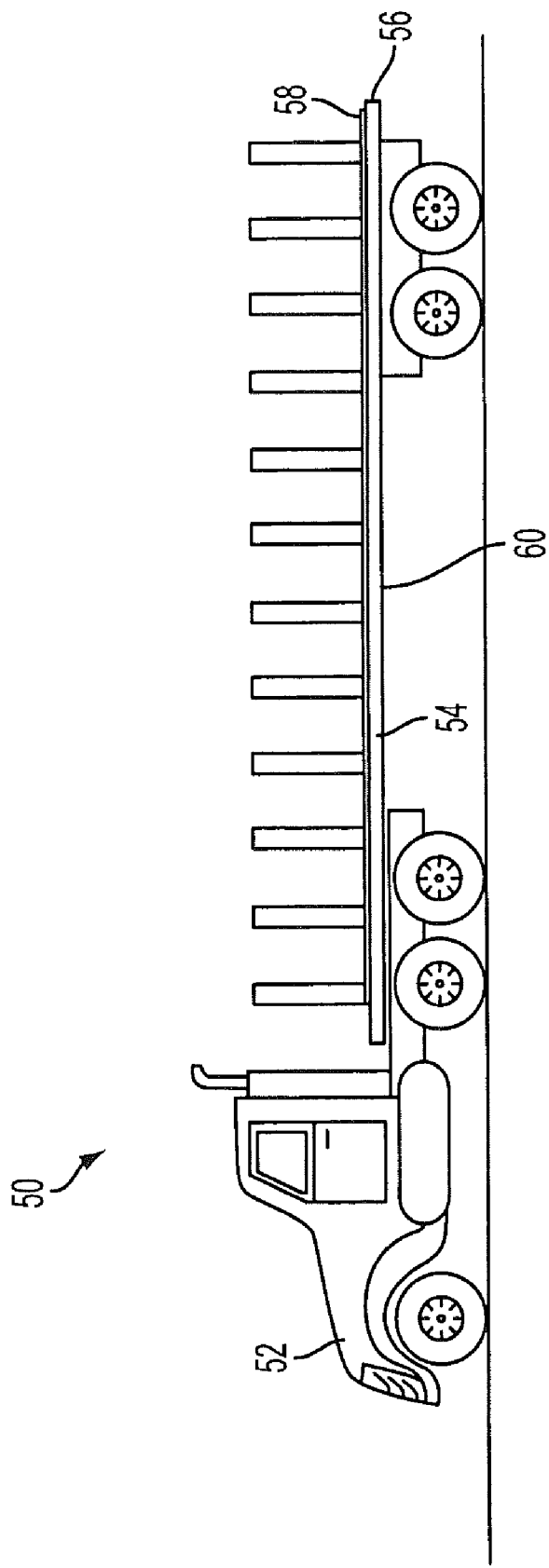
FIG. 4 is a side plan view illustration of a vehicle with the stake of FIG. 1; and, FIG. 5 is a partial perspective view of the vehicle of FIG. 4.
Figure 5:
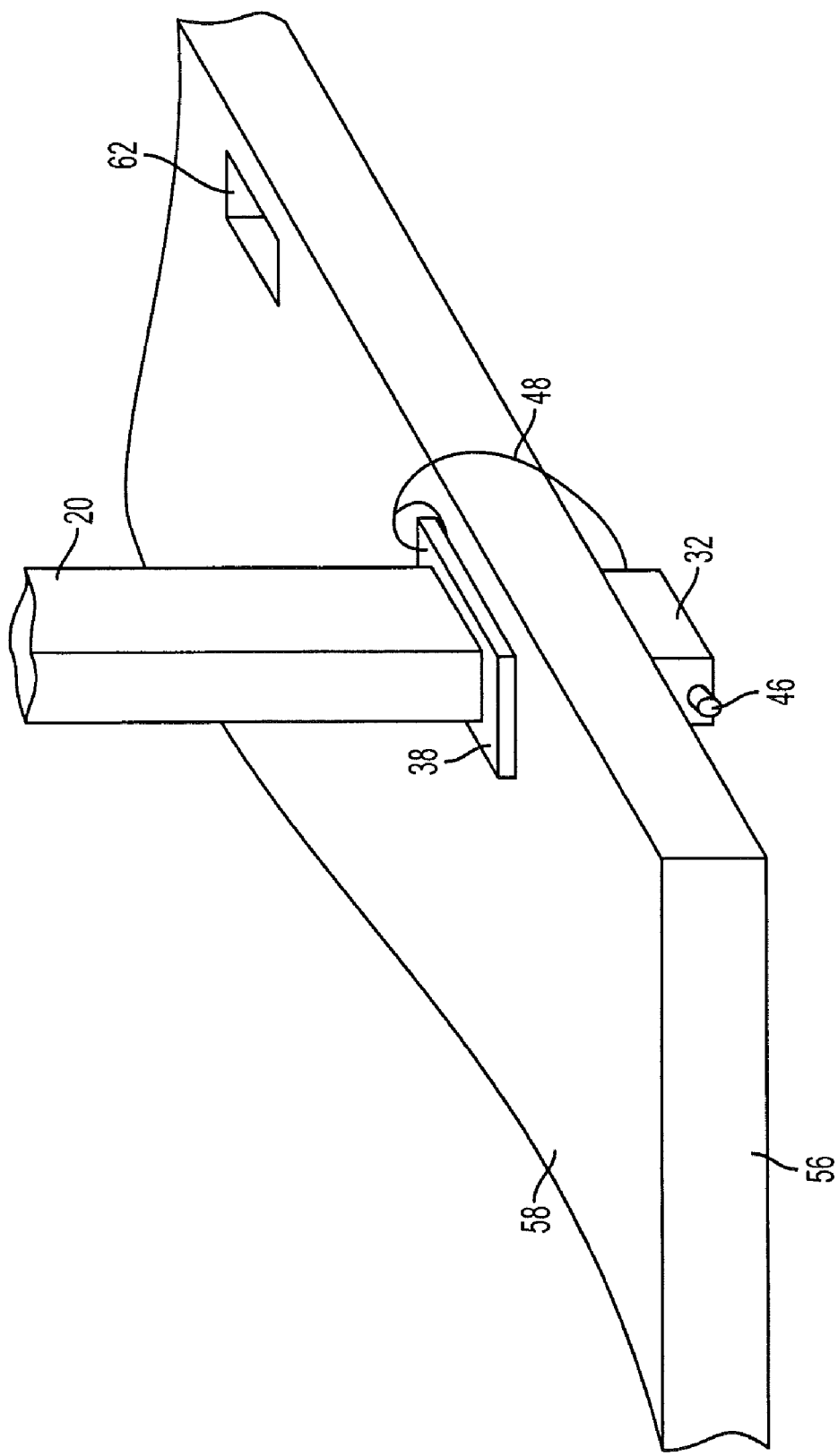

An exemplary application of the stake system 20 with a tractor-trailer 50 is illustrated in FIG. 4 and FIG. 5. The tractor-trailer 50 includes a tractor or engine portion 52 and a trailer 54 having a planar area 56. The trailer 54 is commonly referred to as a "flatbed" trailer. The planar area 56 has an upper surface 58 where goods and articles are stored during transport. The planar area 56 also includes a lower surface 60 opposite the upper surface 58. The planar area 56 also includes a plurality of holes or pockets 62 (FIG. 5) that extend from the upper surface 58 and through the lower surface 60. The pockets 62 are arranged a fixed distance, such as two feet for example, about the periphery of the trailer 54. As discussed above, the pockets 62 are sized to receive the boot 32 of stake system 20.

The benefit of a flatbed type trailer is that it allows goods to be loaded from three sides. This is especially advantageous with long heavy goods, such as pipe or conduit for example, that are loaded by forklift. However, since the trailer 54 has no sides, articles being transported could fall off the trailer 54 during loading or in transit. To resolve this issue, the stake system 20 and pockets 62 cooperate to form a removable support system. To install the stake system 20, the operator inserts the boot 32 into a pocket 62. The boot 32 travels through the pocket 62 until the flange 38 contacts the upper surface 58. It should be appreciated that the flange 38 prevents the stake system 20 from falling completely through the pocket 62.

Once stake 20 is installed, the opening 40 in boot 32 is adjacent to and just below the lower surface 60. The cable 48 is sufficiently long enough to allow the retaining pin 46 to be inserted into the opening 40. Once the pin 46 is installed, the stake system 20 cannot move vertically out of the pocket 62. This provides a more reliable installation and prevents the loss of stakes 20 during rough driving conditions.

The stake system 20 provides a number of advantages in durability, reliability and performance. The stake system 20 may reduce the number of stakes that are damaged during operation. Further, it should be appreciated that in the event that a stake system 20 incurs minor damage, the damaged area could be repaired with shrink wrap material similar to layer 26 or with utility tape without jeopardizing the structural integrity of the stake system 20. The stake system 20 provides additional advantages in that the stake system 20 may be resistant to insect and water damage. The stake system 20 provides further advantages in that it is locked in pocket 62 and cannot accidentally disengage from the vehicle during operation.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another.

Furthermore, the use of the terms a, an, etc. do not denote a limitation of quantity, but rather denote the presence of at least one of the referenced item.

What is claimed is:

1. A flatbed vehicle comprising:
   a substantially planar area having a first side and a second side, said planar area further having a plurality of pockets formed substantially perpendicular and through said planar area;
      a plurality of stakes, each of said plurality of stakes associated with one of said plurality of pockets, said stakes comprising:
   a boot sized to fit in said associated pocket, said boot having a flange on one end wherein said flange is in contact with said planar area first side, said boot further having a first opening adjacent said flange;
   a composite body coupled to said first opening;
   a cap coupled to said composite body; and,
   a cover layer bonded to said composite body between said boot and said cap.

2. The flatbed vehicle of claim 1 wherein said boot further includes a second opening substantially perpendicular to said first opening, said second opening being arranged adjacent said planar area second side when said stake is installed in said pocket.

3. The flatbed vehicle of claim 2 further comprising a pin movably coupled to said flange, wherein said pin is sized to fit in said second opening when said stake is installed in said pocket.

4. The flatbed vehicle of claim 3 wherein said composite body is made from a pultruded fiberglass material.

5. The flatbed vehicle of claim 4 wherein said boot is made from nylon 6/6.

6. The flatbed vehicle of claim 5 wherein said layer is a polyolefin or polyvinyl chloride shrink-wrap material.

* * * * *